United States Patent [19]

Irani

[11] Patent Number: 5,095,984

[45] Date of Patent: Mar. 17, 1992

[54] TRANSPORTING MOBILITY CONTROL AGENTS TO HIGH PERMEABILITY ZONES

[76] Inventor: Cyrus A. Irani, 7718 Stonesdale, Houston, Tex. 77095

[21] Appl. No.: 591,780

[22] Filed: Oct. 2, 1990

[51] Int. Cl.$^5$ .................. E21B 43/22; E21B 33/13
[52] U.S. Cl. .................... 166/268; 166/270; 166/274; 166/292; 166/294
[58] Field of Search ............ 166/268, 273, 274, 285, 166/292, 294, 270; 252/8.551, 8.554

[56] References Cited

U.S. PATENT DOCUMENTS

| | | | |
|---|---|---|---|
| 4,640,361 | 2/1987 | Smith et al. | 166/292 |
| 4,785,883 | 11/1988 | Hoskin et al. | 166/294 |
| 4,828,029 | 5/1989 | Irani | 166/274 |
| 4,844,163 | 7/1989 | Hazlett et al. | 166/274 |
| 4,899,817 | 2/1990 | Djabbarah | 166/273 |
| 4,903,767 | 2/1990 | Shu et al. | 166/273 |
| 4,913,235 | 4/1990 | Harris et al. | 166/274 |
| 4,921,576 | 5/1990 | Hurd | 166/273 |
| 4,945,989 | 8/1990 | Irani et al. | 166/273 |
| 4,945,990 | 8/1990 | Irani et al. | 166/273 |
| 4,947,933 | 8/1990 | Jones et al. | 166/274 |

Primary Examiner—Bruce M. Kisliuk

[57] ABSTRACT

A process for improved delivery of mobility control agents. The drive solvent is designed such that the plugging agent, e.g. surfactant or polymer, is soluble in the drive solvent under the injection conditions of temperature and pressure but is substantially insoluble under the conditions of temperature and pressure in the formation. Typically, miscible drive solvents have more favorable solvent properties at the low injection temperature than at the higher formation temperature. Preferably, solute solubility in miscible drive solvents is increased by the use of appropriate cosolvents. Cosolvent concentration is maintained below the amount needed for solute solubility at reservoir temperatures so that the solute will drop out of solution at some increased temperature depending on the concentration of the cosolvent added to the primary drive solvent.

18 Claims, 1 Drawing Sheet

TRANSPORTING MOBILITY CONTROL AGENTS TO HIGH PERMEABILITY ZONES

FIELD OF THE INVENTION

This invention relates to the transportation of mobility control agents to high permeability zones during miscible drive processes. In particular, this invention relates to the transport of permeability reducing agents for the purpose of enhancing the oil recovery characteristics of a miscible drive solvent such as carbon dioxide or nitrogen or light hydrocarbons or mixtures thereof when injected into subterranean formations.

BACKGROUND OF THE INVENTION

Only a portion of the oil originally present in a subterranean oil-bearing formation is recovered during the primary production cycle. During primary production only the natural pressure present in the formation is exploited for oil recovery. Waterflooding is the most commonly used secondary recovery process. Injection of water into strategically located wells serves to revive formation pressure and to physically displace oil present in the subterranean formation. However, large volumes of the original in-place hydrocarbons, in some instances as much as 50%, still remain trapped in the reservoir even after waterflooding.

Numerous approaches have been taken to try and recover the residual oil after waterflooding has ceased to be economical. These have included thermal methods such as steam stimulation, fire flooding and in situ combustion. Recovery processes have also utilized components such as nitrogen, carbon dioxide and light hydrocarbon gases to displace residual oil. For formations containing lighter oil deposits, for example, oil-bearing strata where the API gravity of the oil phase is 10 or greater, the dominant method for enhanced oil recovery has been carbon dioxide injection. In some limited instances where the oil producing strata are at substantially greater depths, nitrogen has been used because greater injection pressures are required. In some locations, particularly parts of Alaska and Canada, light hydrocarbon gases which are generated during the oil recovery step are subsequently reinjected for pressure maintenance and for the recovery of additional oil.

In a miscible flooding operation, the injected solvent is capable of forming a single phase solution with the oil in place, which assists in the oil recovery step. Barring any areal sweep inefficiencies, a miscible drive process can effectively displace oil from the parts of the reservoir through which the solvent flows because a single phase is flowing through the formation. In multiple phase flow, interfaces and the retentive forces of capillarity and interfacial tension have to be overcome before the oil can be displaced. Carbon dioxide is the most commonly used solvent in miscible displacement processes. Under certain appropriate conditions of oil gravity and reservoir temperature and pressure, carbon dioxide is first contact miscible with reservoir hydrocarbons. However, if the reservoir temperature is too high, or the reservoir pressure is not high enough, carbon dioxide may not be first contact miscible with the in-place hydrocarbons. In such instances, multiple contact miscibility between the injected carbon dioxide and the in-place hydrocarbons is still possible. During multiple contact miscibility, the carbon dioxide initially injected continues to strip light hydrocarbons from successive contacts with the in-place hydrocarbons, until it achieves a composition suitable for miscibility with the reservoir fluids. When carbon dioxide first contacts reservoir hydrocarbons, it dissolves in the oil phase, thus swelling the hydrocarbon fluids and reducing their viscosity. Both of these effects have a very positive influence on final oil production. By swelling the oil, an expansion of the oil phase into existing flowing channels facilitates additional oil recovery. By lowering oil viscosity, the energy required to move the oil through the pore structures in the reservoir is minimized, and again more oil is accessed by the displacing solvent. These two positive effects attend the injection of carbon dioxide irrespective of the displacement process that results. Both nitrogen and light hydrocarbons will show similar positive effects when injected into oil bearing formation. Nitrogen, however, is less soluble in the oil phase. Therefore, oil swelling and viscosity reduction of the in-place hydrocarbons is not as pronounced. Additionally, much higher pressures (relative to carbon dioxide) are required for nitrogen to achieve first or multiple contact miscibility with crude oils.

Light hydrocarbons are excellent displacing solvents for oil because they are very soluble in the oil, causing high swelling and viscosity reduction, and readily achieve first or multiple contact miscibility with the reservoir hydrocarbons. However, the expense of procuring these light hydrocarbons, and of leaving large volumes of these hydrocarbons behind in the reservoir during the displacement process precludes the extensive use of such solvents, except in remote locations where no market for the hydrocarbons is available.

Unfortunately, the efficacy of all these displacement processes is severely hampered by the low viscosity of the injected miscible solvent phase at reservoir conditions. For example, at typical reservoir conditions such as 95° F. and 3500 psia, the injected miscible solvent can be expected to have a viscosity of less than 0.1 centipoise (cp), whereas most reservoir fluids have viscosities ranging in value from 0.4 cp to 8 cp. Under these conditions a very adverse mobility ratio between displaced and displacing fluids is created, resulting in fingering of the displacing fluid through the in-place reservoir fluids and early breakthrough of the injected solvent. This viscosity disparity tends to become even more pronounced at higher temperatures.

An additional fact to consider is reservoir heterogeneity, e.g., high permeability streaks that tend to take the bulk of the injected miscible solvent. This combination of low solvent viscosity and high permeability thief zones tends to aggravate the viscous fingering problem, leading to early breakthrough of solvent, poor areal sweep, and costly solvent recycle processes.

Even in the absence of high permeability streaks, the need for mobility control would be greatly reduced because the multiple contact process will automatically result in a gradual viscosity gradient sufficient to counter the viscosity difference between the injected solvent and the reservoir fluids. By offering a convenient path of least resistance, the high permeability streaks disrupt the formation of a gradual enriched solvent bank with the appropriate viscosity gradient that would minimize solvent breakthrough due to viscous fingering.

U.S. Pat. No. 4,913,235 teaches a method for directly viscosifying the injected solvent by the addition of a polydimethylsiloxane type polymer and a cosolvent such as toluene. U.S. Pat. No. 4,828,029 teaches a method for surfactant transport in order to facilitate in situ foam generation for solvent mobility control. Thus both patents attempt to address the poor areal sweep of the injected solvent due to its low viscosity.

The direct viscosification process described in U.S. Pat. No. 4,913,235 is effective in countering the adverse areal sweep resulting from a viscosity difference between injected solvent and reservoir fluids, but will be relatively ineffectual in minimizing the preferential movement of the injected solvent through the high permeability zone. Correct remedial action for a high permeability zone requires that the zone be plugged in order to force the injected solvent to sweep past it and thus contact a larger volume of the reservoir. For this reason, the process described in U.S. Pat. No. 4,828,029 will be more effective, because the surfactant can be delivered preferentially to the high permeability zone in sufficient concentration to create a foam or emulsion capable of the desired plugging action.

Both of these patents deal with a direct modification of the injected miscible displacement solvent as opposed to some other injected or in situ phase. However, because of the poor solvent properties of most injected solvent phases, the success of the processes described in these two patents is dependent on the use of cosolvents in sufficient amounts to enhance the solubilizing capability of the miscible solvent at reservoir conditions of temperature and pressure. The cheapest miscible drive solvents would be carbon dioxide or methane, or mixtures of the two. However, depending on the reservoir conditions of temperature and pressure, carbon dioxide or methane, or mixtures of the two could prove inadequate for the generation of multiple contact miscibility with reservoir hydrocarbons. In such cases, light hydrocarbons in the C2 through C8 range could be deliberately added to the primary miscible drive solvent to enhance it solubilizing characteristics. Additionally, when solvent breakthrough occurs, usually due to the combined effects of viscous fingering and reservoir heterogeneity, an initially lean injected gas could be substantially enriched with light hydrocarbons stripped from the reservoir fluids. Occasionally these heavier hydrocarbons will be stripped out of the primary solvent on the surface before it is reinjected, but frequently none or only some of the higher molecular weight hydrocarbons are removed from the solvent prior to reinjection. For the purpose of this invention, all the instances of drive solvent enrichment, whether deliberate or incidental, would represent a primary injection solvent reinforced with cosolvents.

For the further purpose of this invention, cosolvents are necessary because the chemical nature of the solvents and solutes involved is such that no hydrogen bonding or dipole-dipole type interactions are feasible between solutes, such as surfactants, or polymers and primary displacement solvents, such as carbon dioxide or methane or nitrogen or mixtures of the same. Consequently, solute solubility is dictated entirely by a matching of the solubility parameter of the solute to that of the solvent. For solvents such as carbon dioxide at typical reservoir conditions, the value of the solubility parameter would be in the range of 6.9 or less, and would decrease with increasing temperature, though increasing pressure would have a beneficial effect. The value of the solubility parameter of hydrocarbon solvents will be slightly higher, and will increase as the contribution from the higher molecular weight components increases.

Unfortunately, the value of the solubility parameter for most surfactants and polymers of interest is considerably greater than 6.9, which necessitates the use of cosolvents in order to increase the solvent solubility parameter to bring it into a more workable range. The remarkable success of the polymer solution process described in U.S. Pat. No. 4,913,235 is dependent on the low value of the solubility parameter for the polydimethylsiloxane polymers, so that solubility at reasonable cosolvent concentrations is possible. The fact that the solubility parameter of the injected solvent decreases with increasing temperature is significant because it dictates the cosolvent concentration required for a particular application. Thus, more cosolvent will be needed to keep a solute, such as a surfactant or polymer, in solution at a given temperature, e.g. 150° F., than would be needed to achieve solubility at a lower temperature, e.g., 130° F.

There still exists a need in the industry for a system that delivers a mobility control agent into the higher permeability zones of a reservoir where it is most needed.

SUMMARY OF THE INVENTION

It is the intent of this invention to teach a method for improved delivery of either physical plugging or foam forming chemicals directly to high permeability streaks in underground hydrocarbon reservoirs in order to improve the areal sweep of the injected solvent. The method of this invention involves the dissolution of surfactants or other appropriate plugging agents into miscible drive solvents to generate an initially homogeneous, single phase mixture. This invention also contemplates the use of cosolvents, as needed. The composition of the resulting mixture is adjusted such that it is homogeneous during the injection phase and during its initial movement into the reservoir. However, at a certain point during the recovery operation, the composition will destabilize due to the influence of some reservoir parameter, preferably temperature, resulting in the physical delivery of the surfactant or appropriate plugging agent to the high permeability zone.

DETAILED DESCRIPTION OF THE INVENTION

Figure 1:
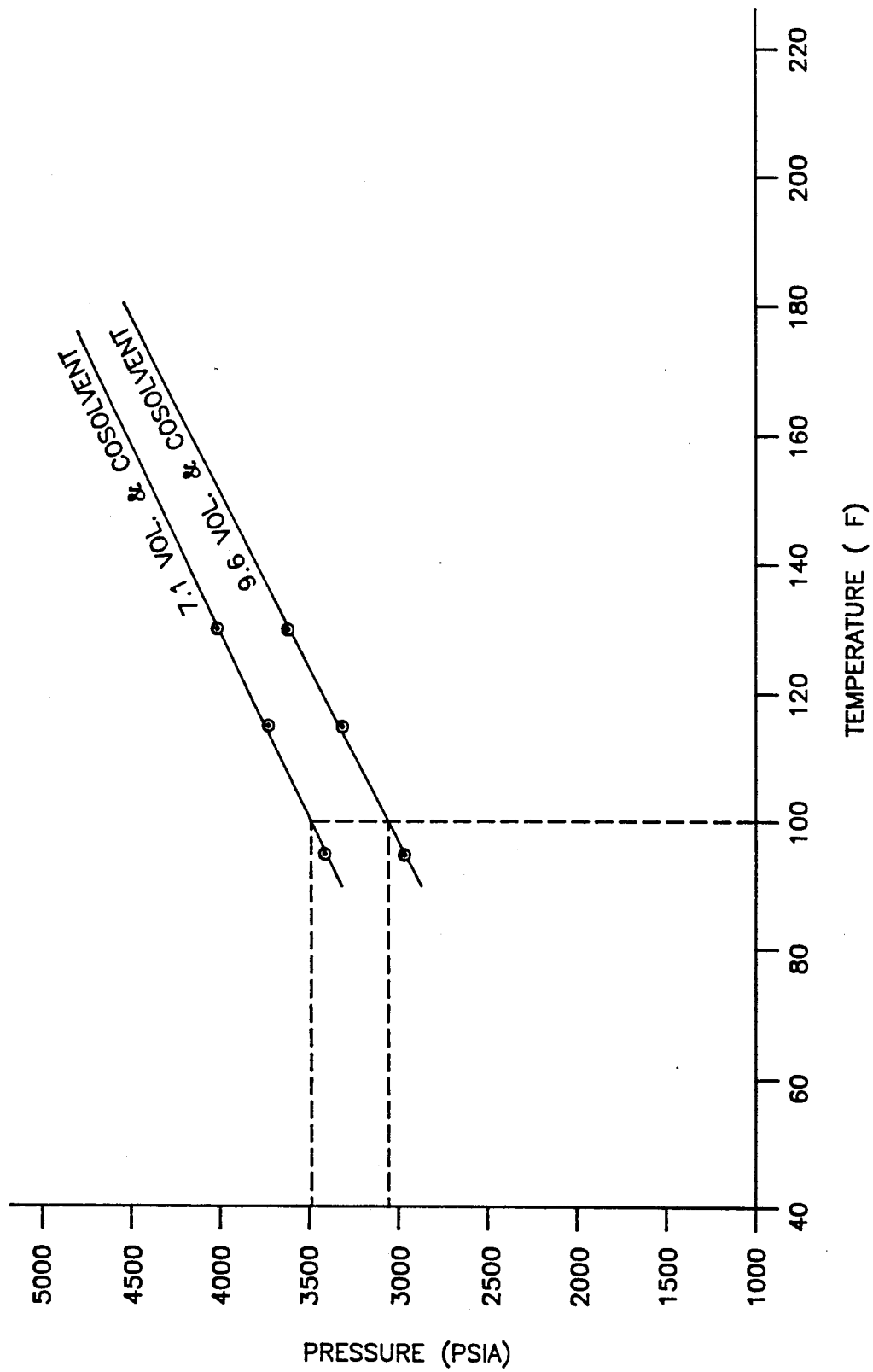
FIG. 1 is a graph depicting polymer solubility.

This invention deals with improving the performance of a miscible solvent drive. Miscibility can be achieved by first contact or multiple contact, both of which concepts are discussed herein. Even though not directly addressed, it will be clear to a person trained in the art, that this same mobility improving process can also be applicable to an immiscible drive process.

The miscible drive of this invention primarily utilizes a light gas, such as carbon dioxide, methane, nitrogen, or mixtures of these gases, as a solvent. A typical example is a carbon dioxide flood, where the carbon dioxide serves as the miscible displacing solvent. The carbon dioxide can be below its critical temperature during the injection step, and will show distinct liquid-like properties. At usual reservoir conditions, however, the carbon dioxide will be above its critical temperature, and its physical properties will vary with pressure. The higher the pressure, the more liquid-like the properties of the carbon dioxide will be. Thus the solubilizing properties of carbon dioxide will improve with increasing pressure, but deteriorate with increasing temperature. One skilled in the art will recognize that the same considerations apply to methane or nitrogen, or any combination of all three.

For the purposes of this disclosure it is understood that the aqueous phase is the water phase present in the reservoir, whether occurring naturally or from prior recovery operations. Additionally, the cosolvent is any component intentionally added to the primary solvent phase or introduced into the solvent phase during the process of oil production that facilitates the dissolution of the solute into the primary solvent.

Further to the purpose of this discussion, a surfactant is any component capable of concentrating at the interface separating immiscible phases. A detailed description of the role and interaction of miscible drive solvents, cosolvents and surfactants applicable to the teachings of this invention is presented in U.S. Pat. No. 4,828,029 and incorporated herein by reference. U.S. Pat. No. 4,828,029 also teaches how the delivery of surfactant to a high permeability zone improves the areal sweep of the miscible flood. This invention compliments U.S. 4,828,029 by teaching a method that impoves the delivery of surfactant to the high permeability zone.

Similarly, U.S. Pat. No. 4,913,235 teaches the scope and interaction of miscible drive solvents, cosolvents and polymers as applicable to the workings of this invention, and that reference is also incorporated herein by reference. As stated earlier, a direct viscosification process such as described in U.S. Pat. No. 4,913,235, would improve the areal sweep of the solvent by limiting the detrimental effects of viscous fingering, but the higher viscosity would be relatively ineffectual against a high permeability zone. Thus this invention improves on the teachings of U.S. Pat. No. 4,913,235, by showing how high molecular weight polymers can also be used to block high permeability streaks.

In the preferred mode, cosolvents are used to help dissolve the solute in the drive solution. It is significant for the purpose of this invention that most miscible drive solvents are delivered at the injection well at temperatures substantially lower than the temperature of the reservoir to be treated. For this reason, the cosolvent requirements at the injection point for dissolving solutes, such as surfactants or polymers, will be substantially lower than at some point further into the reservoir where the miscible solvent begins to approach the temperature of the reservoir. Consequently, by adjusting the concentration of the cosolvent, the solute phase can be made to drop out of solution at any desired temperature at or below the reservoir temperature. The desired temperature will be achieved after some period of time and after the solvent phase with dissolved plugging agent has moved some distance into the reservoir, provided the cosolvent concentration is kept below the minimum required to keep the solute in solution at the reservoir temperature and pressure.

This limitation on the cosolvent concentration is critical to the operation of this invention and is different from prior use of cosolvents in the industry. For example, U.S. Pat. No. 4,913,235 teaches the use of cosolvents to dissolve polymers in miscible drive solvents for increasing the solvent viscosity. However, the cosolvent concentration in U.S. Pat. No. 4,913,235 must be adequate to ensure that the polymer stays in solution at reservoir temperature and pressure throughout its entire displacement cycle from the injector to the producer. Therefore, the minimum cosolvent requirement identified for any application in accordance with U.S. Pat. No. 4,913,235, will exceed the maximum cosolvent allowed for the purpose of this invention.

As stated earlier, this invention requires that the solute come out of solution at some point in the reservoir, preferably due to the action of increasing solvent temperature, in order to plug the undesirable high permeability zone. Thus, this invention teaches the dissolution of surfactants or polymeric plugging agents into miscible drive solvent by exploiting the use of a cosolvent to enhance solute miscibility. The concentration of cosolvent is adjusted to ensure that solute will drop out of solution at some temperature between the solvent injection temperature and the reservoir temperature. By knowing the temperature and rate of injection of the solvent phase and the temperature and pressure of the reservoir, the cosolvent concentration can be adjusted to ensure that the permeability blocking solutes come out of solution in the high permeability zones.

In some instances the primary drive solvent may be directly or indirectly enriched with light hydrocarbons prior to initial injection or during recycle. Because this invention requires only a limited concentration of cosolvent, it is entirely feasible that in cases where the primary solvent has been previously enriched, additional cosolvent may be unnecessary because the solute is sufficiently soluble in the solvent at the injection temperature. Consequently, no additional cosolvent needs to be added because the hydrocarbon enrichment which took place during some earlier step in the injection or recycle process functions as the cosolvent in this invention.

This invention essentially functions by using the miscible drive solvent to carry a solute into the formation and using reservoir conditions, such as temperature or pressure, to effect a change in the solubility of the solute in the miscible drive solvent. Preferably, the increase in temperature of the solvent phase due to movement through the formation will cause the solute to physically drop out of solution in the region that will directly or indirectly improve the areal sweep of the solvent.

In the preferred embodiment, the displacement fluid is composed of more than about 40 volume % carbon dioxide, less than about 20 volume % solute and less than about 40 volume % cosolvent. When light hydrocarbons are used as the displacement solvent, it is preferred that the carbon number be less than 15 and that the hydrocarbon volume be greater than 50%. In this mode, the solute should be less than 20 volume %, and the cosolvent should be less than 30 volume %. When nitrogen is used, the ratios would be about the same as for carbon dioxide.

This invention includes both a method for physically plugging a thief zone by delivering polymer to the high permeability zone and a method for allowing foam formation in the high permeability zone by delivering surfactant to the high permeability zone. Either approach will block the thief zone and considerably improve the areal sweep efficiency of the miscible drive process.

EXAMPLE 1

This example can best be understood by referring to the information presented as FIG. 7 in U.S. Pat. No. 4,913,235. For convenience, relevant information from that figure is reproduced as FIG. 1 in this disclosure.

FIG. 1 presents the solubility characteristics as a function of temperature, pressure and cosolvent concentration of a 6 wt % concentration of a 600,000 centistokes polydimethylsiloxane polymer available from the General Electric company. The solvent is pure carbon dioxide, and the cosolvent is toluene. The system pressure is plotted as the vertical axis in units of pounds per square inch (psia), and temperature is plotted on the horizontal axis as degrees Fahrenheit (F). The curves shown in FIG. 1 are for 7.1 and 9.6 volume % toluene cosolvent.

The interpretation of each cosolvent concentration plot is as follows: a vertical line drawn at any temperature, say 100° F., will intersect each of the cosolvent lines at a specific pressure, 3050 psia for the 9.6 vol. % case and 3500 psia for the 7.1 vol. % case. Essentially, any system containing 6 wt % of the polymer dissolved in a mixture of carbon dioxide containing 7.1 vol. % toluene, and maintained at 100° F. will require a minimum of 3500 psia to maintain the polymer as a single phase solution. The system will always be one phase when the pressure is above 3500 psia, but the polymer will always come out of solution when the pressure is below 3500 psia. However, if the cosolvent concentration were higher, e.g., 9.6 vol. %, then at 100° F. polymer solubility could still be assured at pressures as low as 3050 psia. It is readily apparent that in such systems solute solubility (polymer in this case) is a function of temperature, pressure and cosolvent concentration, and that solute solubility can be adjusted to meet any constraints of temperature and pressure by properly adjusting the cosolvent concentration.

Additionally it has been observed, that for a fixed cosolvent concentration the pressure required to keep solute in solution varies almost linearly with temperature. Again, referring to the 9.6 vol. % cosolvent case, it is obvious that whereas 3000 psia pressure is necessary for the solute to be in solution at 100° F., only 3500 psia is needed for solute solubility at 100° F. An example of a specific working of the invention would be as follows: A subsurface oil bearing reservoir is at 130° F. and 3000 psia pressure. During either secondary or tertiary recovery operations a high permeability streak has been identified that takes most of the injected fluid, adversely affecting the areal sweep of the displacing fluid, and consequently oil recovery. Due to its high permeability character, this zone has also been swept by gas as a natural consequence of a miscible solvent drive operation, or has been deliberately swept by a light gas, such as air or nitrogen or carbon dioxide or light hydrocarbons, during a secondary recovery operation. In order to improve the areal sweep of the recovery process it is necessary that this high permeability streak be plugged.

Plugging action using this invention would be as follows: It is assumed that carbon dioxide is available at the wellhead at 100° F. and can be compressed to 3000 psia by the use of surface pumps. Using additional surface pumps and surface mixing equipment, a cosolvent, preferably toluene, and a polymer, preferably the 600,000 centistokes polydimethylsiloxane identified earlier, are added to the flowing carbon dioxide stream being injected into the reservoir. The cosolvent concentration is in the range of 9.6 vol. % of the carbon dioxide flow, and the polymer concentration is in the range of 6 wt %. Additionally, this treatment would be injected as a controlled slug that would range in size from as little as 0.01% to as much as 20% or higher of the reservoir pore volume, depending on the thickness and extent of the high permeability streak that needs to be plugged.

Again referring to the 9.6 vol. % cosolvent case presented in FIG. 1, the polymer will be in solution in the flowing carbon dioxide phase at the wellhead conditions of 100° F. and 3000 psia. However, as the carbon dioxide phase enters the formation, and flows preferentially through the high permeability zone, the temperature of the injected carbon dioxide phase slowly rises due to its continuous contact with the reservoir rock. According to FIG. 1, at a reservoir temperature of 130° F. and a cosolvent concentration of 9.6 vol. %, the system pressure must be at least 3500 psia for the polymer to stay in solution. Therefore, when the reservoir pressure is only 3000 psia, the polymer comes out of solution as the solvent approaches reservoir temperature, and the polymer is deposited in the high permeability zone.

In this example, the delivery of the mobility control solute was through the influence of reservoir temperature. However, this example is not meant to limit the scope of the invention. In its broadest interpretation, this invention can use any reservoir parameter to reduce the solubilizing property of a cosolvent added to the primary drive solvent for the purpose of dissolving some permeability reducing solute in the primary drive solvent. For example, the cosolvent could be methanol. In this case the temperature effect could still be exploited, but a second reservoir feature, namely the aqueous phase present in the reservoir, could also be used. Due to the very high solubility of methanol in water there will be a strong tendency for the methanol to partition into the water, which will result in a steady depletion of the methanol concentration in the injected solvent phase. As a consequence, the methanol stripping effect can be expected to supplement the temperature effect to give a greater measure of control and greater variability in the performance of this invention.

Knowing that the pore throats in a formation are extremely fine capillary systems, it should be obvious that this invention is not dependent on the use of very high molecular weight or viscous polymers, as discussed above. Fluid systems of a much lower viscosity can also be expected to generate the desired plugging action. Additionally, there might also be some advantage to injecting the cosolvent as a graded concentration slug in order to ensure deeper penetration of the plugging solute. For instance, in Example 1 the leading edge of the solute plus cosolvent phase could have a cosolvent concentration of as high as 11 vol. %, which is slowly graded to the necessary 9.6 vol. % as more of the solute phase is injected. This higher cosolvent concentration at the leading edge will accommodate for the higher cosolvent losses that the leading edge may experience. By increasing the cosolvent concentration, the leading edge of the solute will penetrate deeper into the formation before separation occurs.

Finally, it should also be clear to one skilled in the art, that lowering of pressure will also achieve this same effect. Unfortunately, any substantial pressure reduction in an underground formation is not a simple or quick task. Still, it is possible that a slight or localized pressure variation can be used to advantage to complete the solute delivery process. Thus, a cosolvent concentration adequate to generate exceedingly tenuous solute solubility at reservoir temperatures, will be sufficiently destabilized by a sudden pressure pulse to deliver the solute in the desired location.

As an additional variation on this process, it might be advantageous to use a procedure wherein after the treatment has been injected and placement of the treatment in the high permeability streak has been achieved, further injection is stopped and the slug maintained in this streak until the plugging action has occurred.

The foregoing disclosure and description of the invention are illustrative of the principle of this invention. It is to be understood that various changes in the techniques and materials used may be made without departing from the spirit of the invention.

I claim:

1. An improved method for recovering oil from a subterranean, hydrocarbon-bearing formation which is penetrated by at least one injection well and at least one production well, wherein a non-aqueous displacement fluid is injected into said formation through said injection well and fluids are produced from said production well, the improvement comprising controlling the mobility of the displacement fluid in a high permeability zone of the formation by dissolving in said non-aqueous displacement fluid an effective amount of a solute prior to injecting said fluid into said formation, injecting said displacement fluid into said formation, and lowering the solubility of the solute in the injected displacement fluid thereby causing the solute to precipitate out of solution in said formation.

2. The method of claim 1 wherein the solubility of the solute in the injected displacement fluid is lowered by a change in temperature which occurs after the injected displacement fluid has penetrated into the formation.

3. The method of claim 1 wherein the displacement fluid is a mixture of light hydrocarbons ranging in carbon number between 1 and 15.

4. The method of claim 1 wherein the displacement fluid is comprised of mixtures of carbon dioxide and light hydrocarbons ranging in carbon number between 1 and 15.

5. The method of claim 1 wherein the displacement fluid is comprised of a mixture of carbon dioxide, nitrogen and light hydrocarbons ranging in carbon number from 1 to 15.

6. The method of claim 1 wherein the solute is a surfactant.

7. The method of claim 1 wherein the solute is a surfactant in the HLB range between 0 and 10.

8. The method of claim 1 wherein the solute is a surfactant in the HLB range between 10 and 20.

9. The method of claim 1 wherein the solute is a polymer.

10. The method of claim 9 wherein the solute is a polymer of the polydimethyl siloxane family.

11. The method of claim 1 wherein the solute is a member of the glycol family.

12. The method of claim 1, further comprising adding a cosolvent to the non-aqueous displacement fluid prior to injection to assist in solubilizing the solute in the displacement fluid under injection conditions.

13. The method of claim 12 wherein the concentration of the cosolvent is adjusted such that the solute is solubilized in the displacement fluid under injection conditions of temperature and pressure but is substantially insoluble in the displacing fluid at the formation temperature and pressure.

14. The method of claim 12 wherein the displacement fluid is comprised of more than about 40 vol. % nitrogen, less than about 10 vol. % solute, and less than about 50 vol. % cosolvent.

15. The method of claim 12 wherein the cosolvent is a hydrocarbon ranging in carbon number from $C_2$ to $C_{30}$.

16. Method of claim 12 wherein the cosolvent is a mixture of hydrocarbons derived from available crude oil fractions.

17. The method of claim 12 wherein the cosolvent is an alcohol.

18. The method of claim 12 wherein the cosolvent is a ketone.

* * * * *